United States Patent [19]
Borchardt et al.

[11] Patent Number: 4,554,081
[45] Date of Patent: Nov. 19, 1985

[54] HIGH DENSITY WELL DRILLING, COMPLETION AND WORKOVER BRINES, FLUID LOSS REDUCING ADDITIVES THEREFOR AND METHODS OF USE

[75] Inventors: John K. Borchardt, Duncan, Okla.; S. Prabhakara Rao, Parma, Ohio

[73] Assignee: Halliburton Company, Duncan, Okla.

[21] Appl. No.: 612,203

[22] Filed: May 21, 1984

[51] Int. Cl.[4] ............................................... C09K 7/00
[52] U.S. Cl. .............................. 252/8.5 A; 252/8.5 C; 252/8.55 R
[58] Field of Search ............ 252/8.5 A, 8.5 C, 8.55 R; 526/287, 292.2, 307

[56] References Cited

U.S. PATENT DOCUMENTS

| | | | |
|---|---|---|---|
| 3,679,000 | 7/1972 | Kaufman | 252/8.55 X |
| 4,046,197 | 9/1977 | Gruesbeck et al. | 252/8.5 X |
| 4,293,427 | 10/1981 | Lucas et al. | 252/8.5 |
| 4,330,414 | 5/1982 | Hoover | 252/8.5 |
| 4,404,111 | 9/1983 | Bi et al. | 252/8.55 |
| 4,461,884 | 7/1984 | Peiffer et al. | 526/287 X |
| 4,490,261 | 12/1984 | Heilweil | 252/8.5 |

FOREIGN PATENT DOCUMENTS

| | | | |
|---|---|---|---|
| 2110744 | 6/1983 | United Kingdom | 252/8.55 |

*Primary Examiner*—Herbert B. Guynn
*Attorney, Agent, or Firm*—Thomas R. Weaver; Edward F. Sherer

[57] ABSTRACT

High density well drilling, completion and workover brines having low fluid loss to subterranean formations when in contact therewith are provided comprised of water, one or more inorganic salts, and an additive for reducing fluid loss. The additive is comprised of water soluble binary or ternary copolymers formed from vinyl monomers. Methods of use are also provided.

12 Claims, No Drawings

HIGH DENSITY WELL DRILLING, COMPLETION AND WORKOVER BRINES, FLUID LOSS REDUCING ADDITIVES THEREFOR AND METHODS OF USE

BACKGROUND OF THE INVENTION

In the drilling of well bores penetrating subterranean formations, drilling fluids are generally circulated through the well bores to remove cuttings therefrom and accomplish other purposes. Most drilling fluids are comprised of suspended particles of hydrated clay in water and weighting materials such as barite are frequently combined with the drilling fluids to increase the densities thereof. Various additives are also commonly utilized in drilling fluids to impart desired properties thereto, such as to bring about low fluid loss from the drilling fluids to subterranean formations in contact therewith. However, once a wellbore penetrates a subterranean formation containing desired hydrocarbon fluids, insoluble materials in the drilling fluid such as clay and barite can be damaging to the formation. That is, a filter cake or sheath of such insoluble material can form on the face of the formation and some solids of the filter cake can penetrate into the formation which in turn can result in a permanent reduction in the permeability and hydrocarbon producing ability of the formation.

In order to prevent damage to producing formations during the drilling and completion of well bores penetrating such formations and during subsequently carried out workover procedures, non-damaging brines have heretofore been utilized in lieu of drilling fluids containing insoluble solids. The brines are non-damaging because the salts contained therein which provide density to the brines are dissolved, and no solids are placed in contact with the formations thereby. Because such drilling, completion and workover brines do not contain undissolved solids, they are commonly referred to as "clear brines."

In operations carried out in well bores penetrating subterranean formations containing fluids under high pressures, the brines utilized must have very high densities, e.g., densities in the range of from about 9.0 to 21.5 pounds per gallon, in order to prevent the pressurized fluids from blowing out the wellbore. These brines typically contain KCl, NaCl, $CaCl_2$, NaBr, $CaBr_2$, $ZnCl_2$ and $ZnBr_2$, or combinations of such salts, and are of relatively high cost.

Because of the high cost of high density drilling, completion and workover brines, they are usually recovered, filtered and reused in well servicing operations. The loss of such brines is expensive and undesirable and as a result, fluid loss reduction procedures and additives have heretofore been utilized with high density brines. These include increasing the viscosity of the brines by combining hydratable viscosifiers therewith such as hydroxyethylcellulose and derivatized polysaccharides. While combining such viscosifiers with high density brines has resulted in the reduction of fluid loss, the disadvantages are that relatively large quantities of the viscosifiers are required, difficulties are often encountered in dissolving and hydrating the viscosifiers in high density brines, and the viscosity produced is often lost or greatly lessened when the brines are used in relatively high temperature or low pH environments.

SUMMARY OF THE INVENTION

By the present invention, greatly improved additives for reducing fluid loss from high density well drilling, completion and workover brines are provided. The additives readily dissolve in the high density brines, do not lose their effectiveness at low pH or high temperatures, i.e., temperatures in excess of 200° F., and it is believed that absorption out of the brines onto rock or suspended particle surfaces is low. High density well drilling, completion and workover brines including the additives are readily prepared and have low fluid loss properties. In addition, the fluid loss reduction additives of this invention are effective in high density brines without greatly increasing the viscosity of the brines and can be used in conjunction with hydratable viscosifiers such as hydroxyethyl cellulose.

DETAILED DESCRIPTION OF THE INVENTION

The additives for reducing fluid loss from high density drilling, completion and workover brines of the present invention are comprised of water soluble binary or ternary copolymers or mixtures of such copolymers. The copolymers contain two (binary copolymers) or three (ternary copolymers) different repeating monomer units and are random in nature. That is, the distribution of the repeating monomer units is determined by the concentration and relative reactivity of the monomers which form the repeating monomer units.

The binary and ternary copolymers which are suitable for use in accordance with this invention have the following general formula:

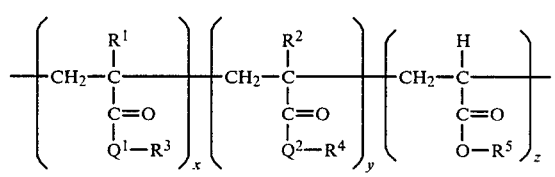

wherein:
$R^1$ and $R^2$ are independently hydrogen or a methyl group;
$Q^1$ and $Q^2$ are independently oxygen, —NH— or —$N(CH_3)_2$;
$R^3$ and $R^4$ are independently hydrogen, an alkyl group containing 1–6 carbon atoms, or an alkyl group containing 1–6 carbon atoms and one or more groups selected from hydroxyl, carbonyl, sulfonic acid, sulfonate, amine and quaternary ammonium; provided that when a quaternary ammonium group is present, a counterion of fluoride, chloride, bromide, iodide or methyl sulfate is also present;
$R^5$ is hydrogen, sodium or potassium; and
x, y and z are integers, the sum of which equals the total number of monomer units in the copolymer required to increase the viscosity of deionized water from about 400 centipoises to about 40,000 centipoises, said viscosity being measured by adding 10.0 grams of the copolymer to 90.0 grams of deionized water to form a solution and measuring said viscosity of said solution on a Brookfield Model LVT viscometer, No. 2 spindle, 6 r.p.m. at about 76° F., and x, y, and z are individually integers such that the repeating monomer unit containing $R^3$ comprises in the range of from about 1 to about 95 mole percent of the copolymer, the repeating monomer unit containing $R^4$ comprises in the range of from about 5 to about 99 mole percent of the copolymer, and the repeating monomer unit containing $R^5$ comprises in the range of from 0 to about 10 mole percent of the copolymer.

A preferred ternary copolymer as described above includes the repeating monomer unit containing $R^3$ in an amount in the range of from about 5 to about 20 mole percent of the copolymer, the repeating monomer unit containing $R^4$ in an amount in the range of from about 70 to about 90 mole percent of the copolymer and the repeating monomer unit containing $R^5$ in an amount in the range of from about 5 to about 10 mole percent of the copolymer.

A preferred binary copolymer as described above includes the repeating monomer unit containing $R^3$ in an amount in the range of from about 25 to about 95 mole percent of the copolymer and the repeating monomer unit containing $R^4$ in an amount in the range of from about 5 to about 75 mole percent of the copolymer (the repeating monomer unit containing $R^5$ not being present, i.e., z is 0).

In a preferred specific ternary copolymer, the repeating monomer unit containing $R^3$ is a 2-acrylamido-2-methylpropane sulfonic acid monomer unit, the repeating monomer unit containing $R^4$ is a N,N-dimethylacrylamide monomer unit and the repeating monomer unit containing $R^5$ is an acrylic acid monomer unit. The most preferred ternary copolymer of this type includes the 2-acrylamido-2-methylpropane sulfonic acid repeating monomer unit in an amount of about 16.8 mole percent of the copolymer, the N,N-dimethylacrylamide monomer unit in an amount of about 73.2 mole percent of the copolymer and the acrylic acid monomer unit in an amount of about 10 mole percent of the copolymer.

Examples of other suitable ternary copolymers include the following ternary copolymers: dimethylaminoethyl methacrylate, N,N-dimethylacrylamide, and acrylic acid; the methyl chloride salt of dimethylaminoethyl methacrylate, dimethylaminoethyl methacrylate and methacrylic acid; diethylaminomethyl methacrylate, N,N-dimethylacrylamide, and acrylic acid; dimethylaminoethyl methacrylate, N-methylacrylamide, and acrylic acid; 2-acrylamido-2-methylpropane sulfonic acid, N-hydroxymethyl acrylamide, and acrylic acid.

In a preferred binary copolymer, the repeating polymer unit containing $R^3$ is a dimethylaminoethyl methacrylate monomer unit and the repeating monomer unit containing $R^4$ is a methyl chloride salt of dimethylaminoethyl methacrylate monomer unit. This binary copolymer preferably contains the dimethylaminoethyl methacrylate repeating monomer unit in an amount in the range of from about 25 to about 95 mole percent of the copolymer and contains the methyl chloride salt of dimethylaminoethyl methacrylate repeating monomer unit in an amount in the range of from about 5 to about 75 mole percent of the copolymer. The most preferred binary copolymer contains repeating monomer units of dimethylaminoethyl methacrylate and its methyl chloride salt in amounts of about 50 mole percent each.

Examples of binary copolymers are copolymers of dimethylaminoethyl methacrylate and the methyl chloride salt of dimethylaminoethyl methacrylate, copolymers of N-vinylpyrrolidone and dimethylaminoethyl methacrylate or the methyl chloride salt of dimethylaminoethylmethacrylate, and copolymers of acrylamide and diallyldimethylammonium chloride.

The binary and ternary copolymers of this invention are synthesized by free radical polymerization in an aqueous solution promoted by a sodium persulfate-tetraethylenepentamine catalyst system or a sodium persulfate-sodium sulfite catalyst system. The monomers are dissolved in the aqueous solution in amounts which correspond to the desired mole percentages of the repeating monomer units in the copolymer, and the solution is placed in a reaction vessel which is purged with inert gas and maintained at a constant temperature of 45° C. One of the above-mentioned catalyst systems is combined with the solution in an amount of about 1.0 percent by weight of the solution and the polymerization is allowed to proceed to completion. Nearly 100 percent conversion is obtained, and the resulting copolymer contains repeating monomer units in approximately the same mole ratios as the mole ratios of starting monomers.

A high density well drilling, completion or workover brine having low fluid loss of the present invention is comprised of water, one or more inorganic salts dissolved in the water in amounts such that the resulting brine has a desired high density and an additive for reducing fluid loss i.e., a binary or ternary copolymer of the type described above, present in the brine in an amount in the range of from about 0.01% to about 1.0% by weight of the brine.

The inorganic salts which can be utilized in the brine vary, but are generally selected from KCl, NaCl, $CaCl_2$, NaBr, $CaBr_2$, $ZnBr_2$, $ZnCl_2$ and combinations of these salts. The salt or salts are dissolved in water in amounts such that the resulting brine has a density ranging from about 9.0 to about 21.5 pounds per gallon and preferably 11.6 to about 15.1 pounds per gallon.

The binary and ternary copolymers of this invention must have sufficient molecular weight to increase the viscosity of deionized water to within the range of from about 400 centipoises to about 40,000 centipoises and preferably about 4,000 centipoises when 10.0 grams of the copolymer are added to 90.0 grams of deionized water to form a solution. The viscosity of the resulting solution is measured on a Brookfield Model LVT Viscometer, No. 2 spindle, 6 r.p.m. at 76° F. Preferably the viscosity measurement is carried out within 3 hours from the formation of the solution.

It is critical that the amount of repeating monomer unit containing $R^5$ be present in the copolymer in an amount of from 0 to about 10 mole percent of the copolymer. Amounts greater than 10 mole percent can result in a copolymer having insufficient solubility in the high density brine.

The binary or ternary copolymer fluid loss reduction additive utilized is combined with the brine by dissolving the additive therein in an effective amount, most preferably in an amount in the range of from about 0.1% to about 0.5% by weight of the brine.

The binary and ternary copolymer fluid loss additives of this invention are water soluble and dissolve in high density brines. The presence of the additive in a high density well drilling, completion or workover brine does not greatly increase the viscosity thereof and the resulting brine has a superior resistance to fluid loss in subterranean formations even at high temperatures, i.e., temperatures above 200° F.

Corrosion inhibitors may be included in the high density well drilling, completion or workover brine. Many of these corrosion inhibitors are disclosed in U.S. Pat. No. 4,444,668, which is assigned to the assignee of the present invention and is hereby incorporated by reference.

In carrying out the methods of this invention wherein a subterranean formation is contacted with a high density well drilling, completion or workover brine while minimizing the loss of the brine into the formation, a copolymer additive for reducing fluid loss described above is combined with the brine in an amount in the range of from about 0.01% to about 1.0% by weight of the brine, preferably in an amount in the range of from about 0.1% to about 0.5% by weight of the brine prior to contacting the formation therewith. The resulting brine-additive solution is introduced into the well bore or otherwise brought into contact with the formation resulting in minimum fluid loss thereto.

EXAMPLES

In order to facilitate a clear understanding of the present invention, the following examples are given.

EXAMPLE I

Various binary and ternary copolymers are synthesized by free radical polymerization of monomers in an aqueous solution as described below. The following monomer abbreviations are used hereinafter:

| | |
|---|---|
| N,N—dimethylacrylamide | NNDMA |
| 2-acrylamido-2-methylpropane sulfonic acid | AMPS |
| acrylic acid | AA |
| methylchloride salt of dimethylaminoethyl methacrylate | DMAEMA.CH$_3$Cl |
| dimethylaminoethyl methacrylate | DMAEMA |
| diallyldimethylammonium chloride | DADMAC |
| N—vinylpyrrolidone | NVP |
| methacrylamido-4,4,8-tetramethyl-4,8-diaza-6-hydroxynonamethylene dichloride | MDTHD |
| methacrylamidopropyltrimethylammonium chloride | MAPTAC |

Preparation (1) Terpolymer of NNDMA (76.8%), AMPS (16.8%) and AA (6.4%)

A solution of NNDMA (33 ml), AMPS (15 g) and AA (2.0 ml) in 500 ml of deionized water is placed in a 1 liter polymerization kettle fitted with a stirrer and a gas inlet and outlet for nitrogen. The reaction vessel is maintained at 45° C. After 30 minutes of bubbling of nitrogen gas, sodium persulfate (0.5 g) followed by sodium sulfite (0.1 g) is added to the monomer solution and polymerization is allowed to proceed for 8 hours under a blanket of nitrogen. The viscous solution containing approximately 10% by weight solid copolymers is sampled. Nearly 100% conversion to polymer is obtained.

In an identical preparation, the catalyst system used is sodium persulfate (0.5 g) and tetraethylenepentamine (0.1 ml). A more viscous polymer solution is obtained.

Preparation (2) Terpolymer of NNDMA (73.2%), AMPS (16.8%) and AA (10.0%)

A procedure identical to that described in preparation (1) above is used for an aqueous solution (500 ml) of NNDMA (31.5 ml), AMPS (15.0 g) and AA (3.1 ml). Nearly 100% conversion is obtained.

Preparation (3) Terpolymer of NNDMA (83.5%), AMPS (10.5%) and AA (6%)

A procedure identical to that described in preparation (1) above is used for an aqueous solution (500 ml) of NNDMA (38.0 ml), AMPS (10.0 g) and AA (2.0 ml). Nearly 100% conversion is obtained.

Preparation (4) Terpolymer of NNDMA (89.3%), AMPS (4.98%) and AA (5.72%)

A procedure identical to that described in preparation (1) above is used for an aqueous solution (500 ml) of NNDMA (43.0 ml), AMPS (5.0 g) and AA (2.0 ml). Nearly 100% conversion is obtained.

Preparation (5) Terpolymer of NNDMA (70.5%), AMPS (23.5%) and AA (6.0%)

A procedure identical to that described in preparation (1) above is used for an aqueous solution (500 ml) of NNDMA (30.3 ml), AMPS (21.0 g) and AA (2.0 ml). Nearly 100% conversion is obtained.

Preparation (6) Terpolymer of NNDMA (64.4%), AMPS (14.1%) and AA (21.5%)

A procedure identical to that described in preparation (1) above is used for an aqueous solution (500 ml) of NNDMA (33.0 ml), AMPS (15.0 g) and AA (8.0 ml). Nearly 100% conversion is obtained.

Preparation (7) Terpolymer of NNDMA (70.0%), AMPS (15.4%) and AA (14.6%)

A procedure identical to that described in preparation (1) above is used for an aqueous solution (500 ml) NNDMA (33.0 ml), AMPS (15.0 g) and AA (8.0 ml). Nearly 100% conversion is obtained.

Preparation (8) Copolymer of Acrylamide (95%) and MAPTAC (5%)

A procedure identical to that described in preparation (1) can be used for an aqueous solution (500 ml) of acrylamide (43.0 g) and MAPTAC (7.0 g).

Preparation (9) Copolymer of Acrylamide (90%) and MAPTAC (10%)

A procedure identical to that described in preparation (1) can be used for an aqueous solution (500 ml) of acrylamide (37.2 g) and MAPTAC (12.8 g).

Preparation (10) Copolymer of Acrylamide (40.1%) and DADMAC (59.9%)

A procedure identical to that described in preparation (1) above can be used except that a 500 ml aqueous solution of acrylamide (10.2 g) and DADMAC (32.3 g) should result in a reaction mixture of 8.5% by weight copolymer.

Preparation (11) Copolymer of Acrylamide (84.1%) and DADMAC (15.9%)

A procedure identical to that described in preparation (1) above can be used except that a 500 ml aqueous solution of acrylamide (17.5 ml) and DADMAC (7.5 g) should result in a reaction mixture of 5% by weight copolymer.

Preparation (12) Copolymer of MDTHD (66.67%) and NNDMA (33.33%)

A procedure identical to that described in preparation (1) above can be used except that a 500 ml aqueous solution of MDTHD (159.0 g) and NNDMA (22.0 g) should result in a reaction mixture of 36.2% by weight copolymer.

Preparation (13) Copolymer of MDTHD (66.67%) and NNDMA (33.33%)

A procedure identical to that described in preparation (1) above can be used except that a 500 ml aqueous solution of MDTHD (117.7 g) and NNDMA (16.3 g) should result in a reaction mixture of 26.8% by weight copolymer.

Preparation (14) Copolymer of MDTHD (33.33%) and NNDMA (66.67%)

A procedure identical to that described in preparation (1) above can be used except that a 500 ml aqueous solution of MDTHD (81.8 g) and NNDMA (45.2 g) should result in a reaction mixture of 25.4% by weight copolymer.

Preparation (15) Copolymer of MDTHD (66.67%) and NNDMA (33.33%)

A procedure identical to that described in preparation (1) above can be used except that a 500 ml aqueous solution of MDTHD (158.1 g) and NNDMA (21.9 g) should result in a reaction mixture of 36.0% by weight copolymer.

Preparation (16) Copolymer of DMAEMA.CH$_3$Cl (25.0%) and DMAEMA (75.0%)

DMAEMA.CH$_3$Cl (8.29 g of 75% active aqueous solution) and DMAEMA (14.0 g) are added to 177.77 g deionized water. Then 0.2 cc of an aqueous 10% (by weight) tetraethylene pentamine solution is added. The pH is adjusted to 3.7 and the mixture placed in a 500 cc 4-neck resin kettle equipped with an overhead stirrer, nitrogen inlet, septum, and Claisen head. A thermometer and a condenser (connected to a gas bubbler) are attached to the Claisen head. The mixture is placed in a 45° C. temperature bath and stirred and sparged with nitrogen for one hour. Then 2.0 ml of aqueous sodium persulfate (10% by weight) solution is injected through the septum via syringe. After five minutes, stirring is terminated. The temperature of the mixture is maintained at 45° C. for 8 hours. Then the highly viscous mixture is cooled to room temperature.

Preparation (17) Copolymer of DMAEMA.CH$_3$Cl (10.0%) and DMAEMA (90.0%)

A procedure identical to preparation (16) is used for an aqueous solution containing DMAEMA.CH$_3$Cl (3.32 g of 75% by weight active aqueous solution) and DMAEMA (16.80 g). Nearly 100% conversion is obtained.

Preparation (18) Copolymer of DMAEMA.CH$_3$Cl (50.0%) and DMAEMA (50.0%)

A procedure identical to preparation (16) is used for an aqueous solution containing DMAEMA.CH$_3$Cl (16.58 g by weight of active aqueous solution) and DMAEMA (9.33 g). Nearly 100% conversion is obtained.

Preparation (19) Copolymer of DMAEMA.CH$_3$Cl (75.0%) and DMAEMA (25.0%)

A procedure identical to preparation (16) is used for an aqueous solution containing DMAEMA.CH$_3$Cl (24.87 g of 75% by weight active aqueous solution) and DMAEMA (4.67 g). Nearly 100% conversion is obtained.

EXAMPLE II

Portions of the various reaction mixtures containing copolymers synthesized as described in Example I were combined with various brines, and the resulting solutions were tested for fluid loss. The fluid loss tests were performed at room temperature (72°–74° F.) using a 100 cc fluid loss cell. The solutions were prepared by adding brine with stirring to a beaker containing water and subsequently adding a mixture containing 7.4% by weight of active copolymer to the aqueous brine solution. A piece of IMCO F-100 filter paper was placed across the base of the cell. A pressure of 10 psig was applied to the fluid loss cell to force the aqueous solution containing the brine and copolymer through the filter paper. The time required to elute certain volumes of the aqueous solution containing the brine and copolymer was measured. The results of the tests are reported in Table I.

TABLE I

Fluid Loss Properties of High Density Brine - Ternary Copolymer Solutions

| Test No. | Mole Percent AMPS | Mole Percent NNDMA | Mole Percent AA | Reaction Mixture Concentration (Weight %)[a] | Reaction Mixture Viscosity [cps (spindle, rpms)] | Fluid Loss Study Weight % Polymer | Fluid Loss Study Brine[c] (ppg) | Flow Time Through Filter sec/50 cc[b] | Flow Time Through Filter sec/100 cc[b] |
|---|---|---|---|---|---|---|---|---|---|
| 1 | — | — | — | — | — | 0 | 11.7 CaCl$_2$ | 41.8 ± 1.2 | 80.6 ± 1.8 |
| 2 | 16.8 | 76.8 | 6.4 | 7.4 | 3140(2,6) | 0.5 | 11.7 CaCl$_2$ | 789.8 ± 0.6 | 1743.4 ± 1.2 |
| 3 | 16.8 | 76.8 | 6.4 | 10.0 | Low MW | 0.5 | 11.7 CaCl$_2$ | 220.8 ± 2.4 | 359.9 ± 0.9 |
| 4 | 16.8 | 76.8 | 6.4 | 10.0 | Low MW | 0.1 | 11.7 CaCl$_2$ | 166.2 ± 2.1 | 400.4 ± 0.2 |
| 5 | 16.8 | 76.8 | 6.4 | 10.0 | 895(2,12) | 0.1 | 11.7 CaCl$_2$ | 77.8 ± 0.2 | 177.3 ± 0.2 |
| 6 | 16.8 | 76.8 | 6.4 | 10.0 | 67,000(5,12) | 0.1 | 11.7 CaCl$_2$ | 2 days - never dissolved | |
| 7 | 16.8 | 76.8 | 6.4 | 10.0 | 80,000(5,12) | 0.1 | 11.7 CaCl$_2$ | 2 days - never dissolved | |
| 8 | 16.8 | 73.2 | 10.0 | 10.0 | 712.5(2,12) | 0.1 | 11.7 CaCl$_2$ | 221.0 ± 2.1 | 902.0 ± 2.0 |
| 9 | 16.8 | 73.2 | 10.0 | 10.0 | 556,000(5,1.5) | 0.1 | 11.7 CaCl$_2$ | 2 days - never dissolved | |
| 10 | 16.8 | 73.2 | 10.0 | 10.0 | 52,500(5,12) | 0.1 | 11.7 CaCl$_2$ | 2 days - never dissolved | |
| 11 | 10.5 | 83.4 | 6.0 | 10.0 | 38,500(2,6) | 0.5 | 11.7 CaCl$_2$ | 583.0 ± 2.4 | 1196.8 ± 1.8 |
| 12 | 10.5 | 83.4 | 6.0 | 10.0 | Low MW | 0.1 | 11.7 CaCl$_2$ | 544.5 ± 1.7 | 1245.6 ± 8.6 |
| 13 | 4.98 | 89.3 | 5.7 | 10.0 | 440,000(2,6) | 0.5 | 11.7 CaCl$_2$ | 639.4 ± 1.2 | 1391.9 ± 2.1 |
| 14 | 4.98 | 89.3 | 5.7 | 10.0 | Low MW | 0.1 | 11.7 CaCl$_2$ | 333.3 ± 1.4 | 845.1 ± 0.8 |
| 15 | 23.5 | 70.5 | 6.0 | 10.0 | 980(2,12) | 0.1 | 11.7 CaCl$_2$ | 104.8 ± 0.1 | 211.8 ± 0.2 |
| 16 | 31.3 | 62.7 | 6.0 | 10.0 | 295,000(2,0.6) | 0.1 | 11.7 CaCl$_2$ | 2 days - never dissolved | |

TABLE I-continued

Fluid Loss Properties of High Density Brine - Ternary Copolymer Solutions

| Test No. | Mole Percent AMPS | Mole Percent NNDMA | Mole Percent AA | Reaction Mixture Concentration (Weight %)[a] | Reaction Mixture Viscosity [cps (spindle, rpms)] | Weight % Polymer | Brine[c] (ppg) | Flow Time Through Filter sec/50 cc[b] | Flow Time Through Filter sec/100 cc[b] |
|---|---|---|---|---|---|---|---|---|---|
| 17 | — | — | — | — | — | 0 | 10.8 NaBr | — | 16.4 ± 0.1 |
| 18 | 16.7 | 76.8 | 6.4 | 10.0 | 3140(2,6) | 0.1 | 10.8 NaBr | 42.6 ± 0.0 | 90.6 ± 0.2 |
| 19 | 16.7 | 76.8 | 6.4 | 10.0 | Low MW | 0.1 | 10.8 NaBr | 20.4 ± 0.1 | 41.8 ± 0.4 |
| 20 | — | — | — | — | — | 0 | 15.0 $CaBr_2/Cl_2$ | 225.1 ± 2.1 | 492.0 ± 4.8 |
| 21 | — | — | — | — | — | 0 | 14.3 $CaBr_2/Cl_2$ | 29.5 ± 0.4 | 63.1 ± 0.6 |
| 22 | 16.7 | 76.8 | 6.4 | 10.0 | 3140(2,6) | 0.1 | 14.3 $CaBr_2/Cl_2$ | 627.4 ± 1.4 | 1335.4 ± 11.2 |
| 23 | 16.7 | 76.8 | 6.4 | 10.0 | Low MW | 0.1 | 14.3 $CaBr_2/Cl_2$ | 128.7 ± 0.1 | 295.0 ± 0.6 |
| 24 | — | — | — | — | — | 0 | 18.5 $Zn/CaBr_2$ | 53.8 ± 2.8 | 115.2 ± 2.3 |
| 25 | 16.7 | 76.8 | 6.4 | 10.0 | 3140(2,6) | 0.1[d] | 18.5 $Zn/CaBr_2$ | 18663.5 | — |
| 26 | 16.7 | 76.8 | 6.4 | 10.0 | Low MW | 0.1[d] | 18.5 $Zn/CaBr_2$ | 6915.3 ± 14.4 | 16128.4 ± 272.4 |

[a]Weight percent of copolymer in reaction mixture.
[b]Average of two determinations ± average deviation.
[c]ppg = lb./gal.
[d]Not completely dissolved.

EXAMPLE III

A series of tests were performed at 180° F. using a Baroid high pressure fluid loss cell equipped with a 5.0 cm long, 4.4 cm inch diameter Berea core. After heating the cell containing an aqueous solution containing various brines and copolymers which were prepared according to Example I, to 180° F., a pressure of 300 psig was applied to the core to force the solution through the Berea core. The time required for elution of the first drop of solution and the time required for the elution of various volume of fluids was determined. The results of these tests are reported in Table II.

of the same terpolymer are effective fluid loss additives in 14.3 ppg calcium bromide-calcium chloride brine.

Referring to Table II, it can be seen that the binary copolymer comprised of 90 mole percent acrylamide and 10 mole percent methacrylamidopropyltrimethylammonium chloride (MAPTAC) very substantially reduced the rate of saturated calcium chloride brine lost. Binary copolymers of acrylamide and diallyldimethylammonium chloride (DADMAC) were also highly effective fluid loss additives for saturated calcium chloride brine. Binary copolymers containing varying proportions of dimethylaminoethylmethacrylate (DMAEMA) and the methyl chloride salt thereof (DMA-

TABLE II

Fluid Loss Properties of High Density Brine - Binary Copolymer Solutions

| Test No. | Monomer 1 Identity | Monomer 1 Mole % | Monomer 2 Indentity | Monomer 2 Mole % | Reaction Mixture Concentration (Weight %)[a] | Reaction Mixture Viscosity [cps (spindle, rpms)] | % Polymer | Brine[c] (ppg) | Flow Time Through Filter sec/50 cc[b] | Flow Time Through Filter sec/100 cc[b] |
|---|---|---|---|---|---|---|---|---|---|---|
| 1. | — | — | — | — | — | — | 0 | 11.7 $CaCl_2$ | 32.8 ± 0.6 | 66.4 ± 1.6 |
| 2. | Acrylamide | 95 | MAPTAC | 5 | 10.0 | — | 0.1 | 11.8 $CaCl_2$ | 38.4 ± 0.6 | 81.1 ± 1.6 |
| 3. | Acrylamide | 90 | MAPTAC | 10 | 10.0 | 145(2,12) | 0.1 | 11.8 $CaCl_2$ | 122.4 ± 4.0 | 587.6 ± 6.7 |
| 4. | Acrylamide | 43.1 | DADMAC | 59.9 | 8.5 | — | 0.1 | 11.7 $CaCl_2$ | 330.1 ± 5.4 | 803.8 ± 12.3 |
| 5. | Acrylamide | 84.1 | DADMAC | 15.9 | 5.0 | — | 0.1 | 11.7 $CaCl_2$ | 207.2 ± 12.2 | 426.6 ± 12.3 |
| 6. | — | — | — | — | — | — | 0 | 11.3 $CaCl_2$ | 29.5 ± 0.4 | 63.5 ± 0.6 |
| 7. | MDTHD | 66.67 | NNDMA | 33.33 | 36.2 | 14,600(2,12) | 0.1 | 11.3 $CaCl_2$ | 42.6 ± 1.2 | 86.8 ± 2.1 |
| 8. | MDTHD | 66.67 | NNDMA | 33.33 | 26.8 | 12,800(2,12) | 0.1 | 11.3 $CaCl_2$ | 44.2 ± 2.0 | 87.3 ± 0.6 |
| 9. | MDTHD | 33.33 | NNDMA | 67.67 | 25.4 | 6,600(2,12) | 0.1 | 11.3 $CaCl_2$ | 51.4 ± 0.3 | 107.3 ± 1.1 |
| 10. | MDTHD | 66.7 | DMAEMA | 33.33 | 36.0 | 13,800(2,12) | 0.1 | 11.3 $CaCl_2$ | 34.8 ± 0.3 | 70.6 ± 1.1 |
| 11. | DMAENA | 100 | — | — | 10.0 | — | 0.1 | 11.7 $CaCl_2$ | 104.6 ± 1.0 | 240.1 ± 1.8 |
| 12. | $DMAEMA.CH_3Cl$ | 10 | DMAEMA | 90 | 10.0 | 2,264(2,12) | 0.1 | 11.7 $CaCl_2$ | 105.2 ± 1.2 | 237.6 ± 0.70 |
| 13. | $DMAEMA.CH_3Cl$ | 50 | DMAEMA | 50 | 10.0 | 573(2,12) | 0.1 | 11.7 $CaCl_2$ | 72.1 ± 1.1 | 148.8 ± 1.2 |
| 14. | $DMAEMA.CH_3Cl$ | 75 | DMAEMA | 25 | 10.0 | 920(2,12) | 0.1 | 11.7 $CaCl_2$ | 69.4 ± 0.2 | 150.1 ± 1.4 |
| 15. | $DMAEMA.CH_3Cl$ | 50 | DMAEMA | 40 | 10.0 | 264,400(2,0.6) | 0.1 | 11.7 $CaCl_2$ | 229.5 ± 1.6 | 1001.8 ± 7.2 |

[a]Weight percent of copolymer in reaction mixture.
[b]Average of two determinations ± average deviation.
[c]ppg = lb./gal.

From Table I it can be seen that the most effective ternary copolymer of 2-acrylamido-2-methylpropane sulfonic acid (AMPS), N,N-dimethylacrylamide (NNDMA) and acrylic acid (AA) in 11.7 ppg calcium chloride brine is the terpolymer of Test 2 which is comprised of 16.8 mole percent 2-acrylamido-2-methylpropane sulfonic acid, 76.8 mole percent N,N-dimethylacrylamide and 6.4 mole percent acrylic acid.

From Tests 17–19, it can be seen that the same ternary copolymer substantially reduced the fluid loss from a 10.8 ppg sodium bromide brine. Tests 20–23 show that both high and low molecular weight versions $EMA.CH_3Cl$) are shown to be effective fluid loss additives in saturated calcium chloride brine.

EXAMPLE IV

A series of tests were performed at 180° F. using aqueous solutions containing various brines and copolymers prepared in accordance with Example I.

The equipment used in the tests comprised a Berea core placed in a test chamber. The Berea cores were drilled and cut to a diameter of 4.4 cm and had a length of 5.0 cm. To prevent crossflow from the side of the core, the core sides were coated with Matcote LD-2882 white epoxy resin. The resin was set by adding 8% by volume of a catalyst, EC-5725, to the resin.

The aqueous solutions were prepared by adding various copolymer to an aqueous brine solution. The brine solution was filtered through 1.2 micron filter paper prior to the addition of the copolymers.

The test chamber containing the core and mixture of copolymer and brine was heated to 180° F. A pressure of 300 psig was then applied to the test chamber. The time required for the elution of 50 cc, 85 cc or 100 cc of the aqueous mixture was then determined. The results of these tests are shown in Table III and Table IV.

weight requirement of the copolymers used in the present invention.

This invention is not limited to the above-described specific embodiments thereof; it must be understood, therefore, that the detail involved in the descriptions of the specific embodiments is presented for the purpose of illustration only, and that reasonable variations, which will be apparent to those skilled in the art, can be made in this invention without departing from the spirit and scope thereof.

What is claimed is:

1. A method of contacting a subterranean formation with a high density well drilling, completion or worko-

TABLE III

Fluid Loss Properties of High Density Brines - Ternary Copolymer Solutions At 180° F.

| Test No. | Mole Percent | | | Brine (ppg) | Weight % Polymer | Fluid Loss Study | | | |
|---|---|---|---|---|---|---|---|---|---|
| | AMPS | NNDMA | AA | | | Viscosity (cps spindle, rpm) | Flow Time | | |
| | | | | | | | sec/50 cc | sec/85 cc | sec/100 cc |
| 1. | — | — | — | 11.6 CaCl$_2$ | 0 | 9.2 (UL,6) | 18.6 | — | 33.4 |
| 2. | 18.0 | 82.0 | 0.0 | 11.6 CaCl$_2$ | 0.5 | 50.3 (UL,6) 48.0 (UL,12) | 46.6 | 75.5 | — |
| 3. | 18.0 | 82.0 | 0.0 | 11.6 CaCl$_2$ | 0.5 | 46.4 (UL,6) 44.5 (UL,12) | 52.6 | 74.2 | — |
| 4. | 18.0 | 82.0 | 0.0 | 11.6 CaCl$_2$ | 0.5 | 13.4 (UL,12) | 8.4 | 18.8 | — |
| 5. | 16.8 | 76.8 | 6.4 | 11.6 CaCl$_2$ | 0.5 | 54.3 (UL,6) | 29.2 | 44.8 | — |
| 6. | 16.8 | 76.8 | 6.4 | 11.6 CaCl$_2$ | 0.5 | 28.5 (UL,6) 25.9 (UL,12) | 15.1 | 24.2 | — |
| 7. | 15.3 | 70.0 | 14.6 | 11.6 CaCl$_2$ | 0.5 | 31.0 (UL,6) 30.9 (UL,12) | 23.8 | 37.2 | — |
| 8. | 10.5 | 83.4 | 6.0 | 11.6 CaCl$_2$ | 0.5 | 40.5 (UL,6) 38.4 (UL,12) | 33.8 | 54.6 | — |
| 9. | 4.98 | 89.3 | 5.7 | 11.6 CaCl$_2$ | 0.5 | 43.2 (UL,6) 41.5 (UL,12) | 32.5 | 54.0 | — |
| 10. | — | — | — | 14.2 CaBr$_2$/Cl$_2$ | 0 | 10.5 (1,60) | 9.4 | — | 18.2 |
| 11. | 18.0 | 82.0 | 0.0 | 14.2 CaBr$_2$/Cl$_2$ | 0.1 | 13.5 (1,60) | 15.0 | 23.6 | 27.1 |
| 12. | 18.0 | 82.0 | 0.0 | 14.2 CaBr$_2$/Cl$_2$ | 0.1 | 11.0 (1,60) | 8.9 | 12.0 | 14.1 |
| 13. | 16.8 | 76.8 | 6.4 | 14.2 CaBr$_2$/Cl$_2$ | 0.1 | 13.5 (1,60) | 14.1 | 22.9 | 26.8 |
| 14. | 15.3 | 70.0 | 14.6 | 14.2 CaBr$_2$/Cl$_2$ | 0.1 | 12.5 (1,60) | 13.8 | 21.3 | 24.8 |
| 15. | 14.1 | 64.4 | 21.5 | 14.2 CaBr$_2$/Cl$_2$ | 0.1 | 11.4 (1,60) | 9.0 | 14.6 | 16.8 |
| 16. | — | — | — | 10.8 NaBr | 0 | 4.0 (1,60) | — | — | 6.1 |
| 17. | 16.8 | 76.8 | 6.4 | 10.8 NaBr | 0.1 | 4.2 (1,60) | — | 6.1 | — |

TABLE IV

Fluid Loss Properties of High Density Brines - Binary Copolymer Solutions at 180° F.

| Test No. | Monomer 1 | | Monomer 2 | | Brine (ppg) | Weight % Copolymer | Fluid Loss Study | | | |
|---|---|---|---|---|---|---|---|---|---|---|
| | Identity | Mole % | Identity | Mole % | | | Viscosity (cps spindle, rpm) | Flow Time | | |
| | | | | | | | | sec/50 cc | sec/85 cc | sec/100 cc |
| 1. | — | — | — | — | 11.6 CaCl$_2$ | 0 | 11.6 (UL,6) | 18.6 | — | 33.4 |
| 2. | AMPS | 18.0 | NNDMA | 82.0 | 11.6 CaCl$_2$ | 0.5 | 50.3 (UL,6) | 46.6 | 75.5 | — |
| 3. | AMPS | 18.0 | NNDMA | 82.0 | 11.6 CaCl$_2$ | 0.5 | 46.4 (UL,6) | 52.6 | 74.2 | — |
| 4. | AMPS | 18.0 | NNDMA | 82.0 | 11.6 CaCl$_2$ | 0.5 | 13.4 (UL,6) | 8.4 | 18.8 | — |
| 5. | — | — | — | — | 14.2 CaBr$_2$/Cl$_2$ | 0 | 10.5 (1,60) | 9.4 | — | 18.2 |
| 6. | AMPS | 18.0 | NNDMA | 82.0 | 14.2 CaBr$_2$/Cl$_2$ | 0.1 | 13.5 (1,60) | 15.0 | 23.6 | 27.1 |
| 7. | AMPS | 18.0 | NNDMA | 82.0 | 14.2 CaBr$_2$/Cl$_2$ | 0.1 | 11.0 (1,60) | 8.9 | 12.0 | 14.1 |
| 8. | MDTHD | 33.33 | NNDMA | 66.67 | 14.2 CaBr$_2$/Cl$_2$ | 0.1 | 13.0 (1,60) | 6.5 | 11.2 | — |

The data reported in Table III shows that the copolymers utilized in Tests 2, 3, 5, 7-9, 11, 13, 14, and 17 reduced the rate of fluid loss. The copolymers utilized in Tests 4, 6, 12, and 15 did not reduce fluid loss. It is believed that the reason for this was that the copolymers had a molecular weight which was less than the molecular weight requirement of the copolymers used in the present invention.

The data reported in Table IV shows that the copolymers utilized in Tests 2, 3, and 6 were effective in reducing fluid loss. The copolymers utilized in Tests 4, 7, and 8 were not effective in reducing fluid loss. It is believed that the reason for this was that the copolymers had a molecular weight which was less than the molecular ver brine having a density of from about 9.0 to about 21.5 pounds per gallon while minimizing the loss of such brine into said formation comprising:

combining an additive for reducing fluid loss with said brine in an amount in the range of from about 0.01 percent to about 1.0 percent by weight of said brine prior to contacting the formation therewith, said additive comprising a water-soluble binary copolymer comprising dimethylaminoethyl methacrylate repeating monomer unit present in an amount in the range of from about 25 to about 95 mole percent of said copolymer and a methyl chloride salt of dimethylaminoethyl methacrylate repeating monomer unit present in an amount in the range of from about 5 to about 75 mole percent of the copolymer wherein the total number of repeating monomer units in the copolymer increases the viscosity of deionized water to within the range of from about 400 centipoises to about 40,000 centipoises said viscosity of said copolymer being measured by adding 10.0 grams of the copolymer to 90.0 grams of deionized water to form a solution and measuring said viscosity of said solution with a Brookfield LVT Viscometer, No. 2 spindle, 6 r.p.m. at 7620 F.; and, contacting said formation with said drilling, completion or workover brine containing said additive.

2. The method recited in claim 1 wherein said additive is present in said brine in an amount in the range of from about 0.1 percent to about 0.5 percent by weight of said brine.

3. The method recited in claim 2 wherein the dimethylaminoethyl methacrylate repeating monomer unit is present in an amount of about 50 mole percent of said copolymer and the methyl chloride salt of dimethylaminoethyl methacrylate repeating monomer unit is present in an amount of about 50 mole percent of said copolymer.

4. The method recited in claim 3 wherein said subterranean formation has a temperature greater than 200° F.

5. The method recited in claim 4 wherein the density of said brine is from about 11.6 pounds to about 15.1 pounds per gallon.

6. The method recited in claim 5 wherein the total number of monomer repeating units in the copolymer is sufficient to increase the viscosity of deionized water to about 4,000 centipoises, said viscosity of said copolymer being measured by adding 10.0 grams of copolymer to 90.0 grams of deionized water to form a solution and measuring said viscosity of said solution with a Brookfield Model LVT Viscometer, No. 2 spindle, 6 r.p.m. at 76° F.

7. A method of contacting a subterranean formation with a high density well drilling, completion or workover brine having a density of from about 9.0 to about 21.5 pounds per gallon while minimizing the loss of such brine into said formation comprising:

combining an additive for reducing fluid loss with said brine in an amount in the range of from about 0.01 percent to about 1.0 percent by weight of said brine prior to contacting said formation therewith, said additive comprising a water-soluble ternary copolymer selected from the group consisting of:

(a) a ternary copolymer comprising dimethylaminoethyl methacrylate repeating monomer unit present in an amount in the range of from about 5 to about 20 mole percent of the copolymer, N,N-dimethylacrylamide repeating monomer unit present in an amount in the range of from about 70 to about 90 mole percent of the copolymer, and acrylic acid repeating monomer unit present in an amount in the range of from about 5 to about 10 mole percent of the copolymer;

(b) a ternary copolymer comprising a methyl chloride salt of dimethylaminoethyl methacrylate repeating monomer unit present in an amount in the range of from about 5 to about 20 mole percent of the copolymer, dimethylaminoethyl methacrylate repeating monomer unit present in an amount in the range of from about 70 to about 90 mole percent of copolymer, and methacrylic acid repeating monomer unit present in an amount in the range of from about 5 to about 10 mole percent of the copolymer;

(c) a copolymer comprising diethylaminomethyl methacrylate repeating monomer unit present in an amount in the range of from about 5 to about 20 mole percent of the copolymer, N,N-dimethylacrylamide repeating monomer unit present in an amount in the range of from about 70 to about 90 mole percent of the copolymer, and acrylic acid repeating monomer unit present in an amount in the range of from about 5 to about 10 mole percent of the copolymer;

(d) a copolymer comprising dimethylaminoethyl methacrylate repeating monomer unit present in an amount in the range of from about 5 to about 20 mole percent of the copolymer, N-methacrylamide repeating monomer unit present in an amount in the range of from about 70 to about 90 mole percent of the copolymer, and acrylic acid repeating monomer unit present in an amount in the range of from about 5 to about 10 mole percent of the copolymer;

(e) a copolymer comprising 2-acrylamido-2-methylpropane sulfonic acid repeating monomer unit present in an amount in the range of from about 5 to about 20 mole percent of the copolymer, N-hydroxymethyl acrylamide repeating monomer unit present in an amount in the range of from about 70 to about 90 mole percent of the copolymer, and acrylic acid repeating monomer unit present in an amount in the range of from about 5 to about 10 mole percent of the copolymer;

(f) a copolymer comprising 2-acrylamido-2-methylpropane sulfonic acid repeating monomer unit present in an amount in the range of from about 5 to about 20 mole percent of the copolymer, N,N-dimethylacrylamide repeating monomer unit present in an amount in the range of from about 70 to about 90 mole percent of the copolymer, and acrylic acid repeating monomer unit present in an amount of about 5 to about 10 mole percent of the copolymer; and (g) mixtures thereof;

wherein the total number of monomer units in the copolymer is sufficient to increase the viscosity of deionized water to within the range of from about 400 centipoises to about 40,000 centipoises said viscosity of said copolymer being measured by adding 10.0 grams of the copolymer to 90.0 grams of deionized water to form a solution and measuring said viscosity of said solution with a Brookfield Model LVT Viscometer, No. 2 spindle, 6 r.p.m. at 76° F.;

contacting said formation with said drilling, completion or workover brine containing said additive.

8. The method recited in claim 7 wherein said additive is combined with said brine in an amount in the range of from about 0.1 percent to about 0.5 percent by weight of said brine.

9. The method recited in claim 8 wherein the total number of monomer repeating units in the copolymer is sufficient to increase the viscosity of deionized water to about 4,000 centipoises, said viscosity of said copolymer being measured by adding 10.0 grams of the copolymer to 90.0 grams of deionized water to form a solution and measuring said viscosity of said solution with a Brookfield Model LVT Viscometer, No. 2 spindle, 6 r.p.m. at 76° F.

10. The method recited in claim 9 wherein said additive comprises a ternary copolymer which includes a 2-acrylamido-2-methylpropane sulfonic acid repeating monomer unit present in the copolymer in an amount of about 16.8 mole percent of the copolymer, a N,N-dimethylacrylamide repeating monomer unit present in the copolymer in an amount in the range of from about 73.2 mole percent of the copolymer and an acrylic acid repeating monomer unit present in the copolymer in an amount of about 10 mole percent of the copolymer.

11. The method recited in claim 10 wherein the density of said brine is from about 11.6 to about 15.1 pounds per gallon.

12. The method recited in claim 11 wherein said subterranean formation has a temperature greater than 200° F.

* * * * *